3,133,057
TRITERPENOID ACID DERIVATIVES
David W. Rosenthal, New Brunswick, and Josef Fried, Princeton, N.J., assignors to Olin Mathieson Chemical Corporation, New York, N.Y., a corporation of Virginia
No Drawing. Filed Apr. 17, 1962, Ser. No. 188,242
13 Claims. (Cl. 260—239.57)

This invention relates to and has for its objects the production of new physiologically active steroids, methods for preparing the same, and new intermediates useful in said preparation.

The final products of this invention can be represented by the formulae

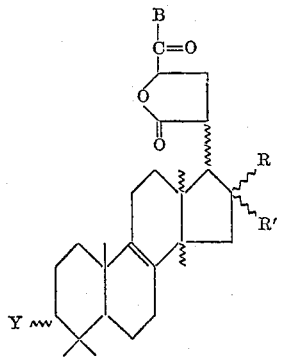

and

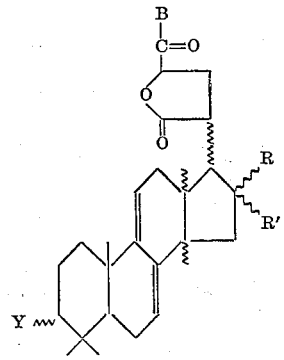

wherein B is selected from the group consisting of hydrogen and lower alkyl, Y is selected from the group consisting of hydrogen, hydroxy acyloxy and oxo (O=) and R and R' may be the same or different and may be selected from the group consisting of hydrogen, hydroxy and acyloxy. In this application and in the appended claims, whenever in the formulae set forth herein, a curved line [∫] is employed in the linkage of atoms, it is meant to denote that the connected atom may be either in the alpha or beta position, as is determined in the respective compounds involved.)

The preferred acyloxy radicals are those of hydrocarbon carboxylic acids of less than twelve carbon atoms, as exemplified by the lower alkanoic acids (e.g. acetic, propionic, butyric and tertpentanoic), the lower alkenoic acids, the monocyclic aryl carboxylic acids (e.g., benzoic and toluic acid), the monocyclic aryl lower alkanoic aids (e.g., phenylaetic and β-phenylpropionic acid), the cycloalkane carboxylic acids and the cycloalkene carboxylic acids.

The compounds of this invention are physiologically active compounds which possess antiandrogenic activity and thus may be employed instead of A-norprogesterone, for example, in the treatment of acne, for which purpose they can be administered in the same manner as A-norprogesterone, for example, the dosage being adjusted for the relative potency of the particular steroid.

The final products of this invention are prepared by the process of this invention which entails a number of steps beginning with a triterpenoid acid as a starting material. By a triterpenoid acid, it is here meant, a polymethylsteroid, having D-ring structure represented by the formula

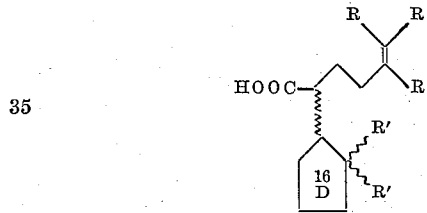

wherein R may be the same or different and may be either hydrogen or lower alkyl and R' may be the same or different and may be either hydrogen or hydroxy. Examples of the triterpenoid acids which may be employed in the practice of this invention include eburicoic, polyporenic, tumulosic, pinicolic, elemolic, elemonic, dehydroeburicoic, dehydroelemolic, dehydroelemonic and other like acids. The steps of the process (employing eburicoic acid as the starting material are shown by the following equations wherein R" represents acyl:

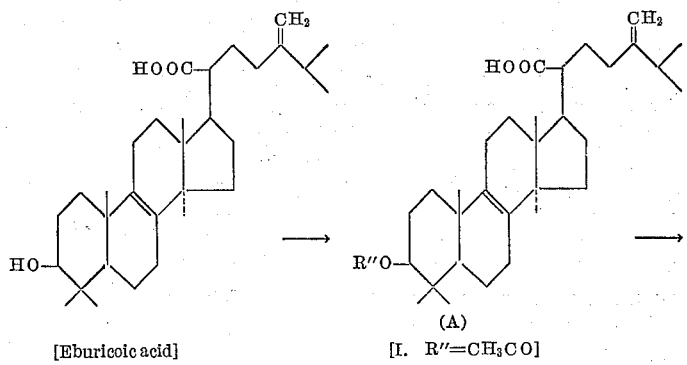

[Eburicoic acid]   [I. R"=CH₃CO]

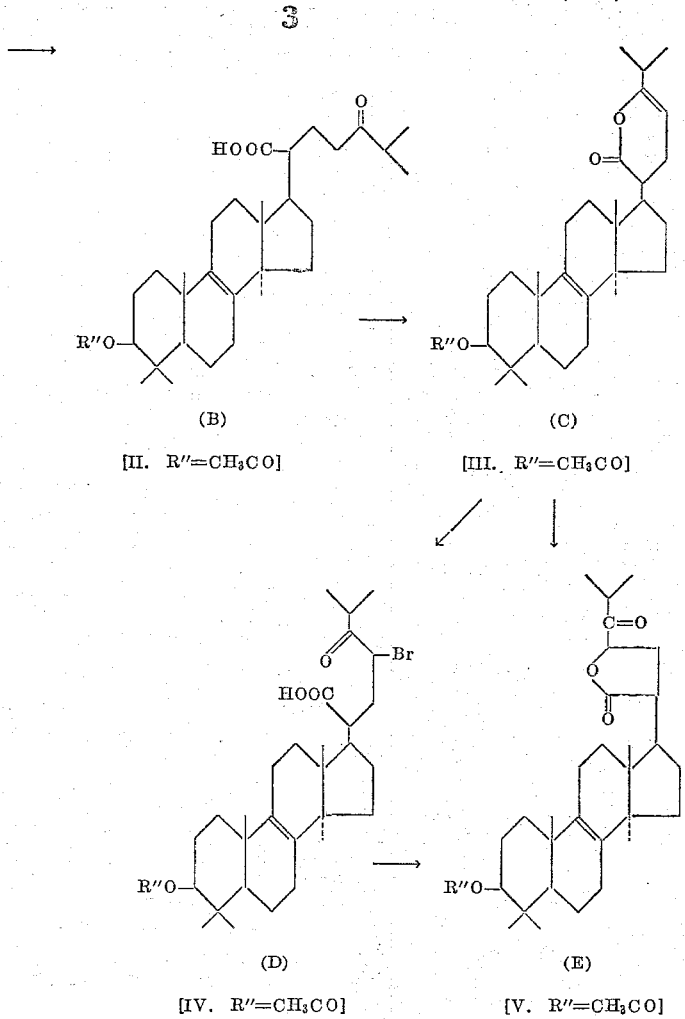

In the first step of the process of this invention eburicoic acid is converted to its 3-ester derivative (compounds A). The 3-acetate of eburicoic acid is a known compound. Other 3-esters can be prepared in the usual manner by reacting with the desired acylating agent (e.g., acyl chloride or acid anhydride) in the presence of a base, such as pyridine. Although any ester can be prepared, the preferred esters are those with hydrocarbon carboxylic acids of less than twelve carbon atoms. These are formed by reacting with the acyl chloride or acid anhydride of a hydrocarbon carboxylic acid of less than twelve carbon atoms, such as one of the acids listed hereinbefore.

The 3-ester is then converted to a corresponding ester of 24-keto-$\Delta^8$-lanostene-21-acid (compounds B). This may be done by ozonolysis of compounds A and reducing the ozonide formed by treatment with either hydrogen in the presence of a hydrogenation catalyst, such as palladium on charcoal, or an electropositive metal, such as zinc, in the presence of an acid, such as glacial acetic acid, whereby compounds B are obtained directly.

Compounds B are then lactonized by treatment with an acid anhydride and a salt of a strong base and a weak acid, such as sodium acetate in acetic anhydride, to yield the α-lactone (compounds C) of the corresponding 3-esters of 3β-hydroxy-24-keto-$\Delta^8$-lanostene-21-oic acid. The reaction is preferably carried out at an elevated temperature, such as the reflux temperature of the organic solvent employed and the α-lactone is separated for further treatment.

The α-lactone (compounds C) is then acidified with perchloric acid and treated with a haloimide, such as bromosuccinimide or halo amide, such as N-bromo-acetamide, or a halo-hydantoin, such as dibromodimethyl-hydantoin to obtain the halo acids (compounds D). These are new compounds of the instant invention.

To obtain the final products of this invention the halo acid (compounds D) are converted to the keto lactone (compounds E) by treatment with a basic reagent such as sodium acetate, collidine or acetic anhydride in the presence of a basic salt, such as calcium carbonate.

Alternatively, the final products of this invention may be obtained by treating the α-lactone (compounds C) with a haloimide, for example, N-bromosuccinimide or a haloamide, for example, N-bromoacetamide or a halo-hydantoin, for example dibromodimethyl-hydantoin in the presence of an acetate buffer, thus providing the final keto-lactone directly.

The procedures hereinbefore set forth with regard to the treatment of eburicoic acid to obtain the final products of this invention, may likewise be applied to other triterpenoid acids to give like results. Thus, where tumulosic acid is employed as the starting material as a substitute for eburicoic acid, the results set forth in the following equations are obtained. (The process as described hereinbefore for the compounds obtained from eburicoic acid are likewise applied to the corresponding compounds of the other triterpenoic acids.)

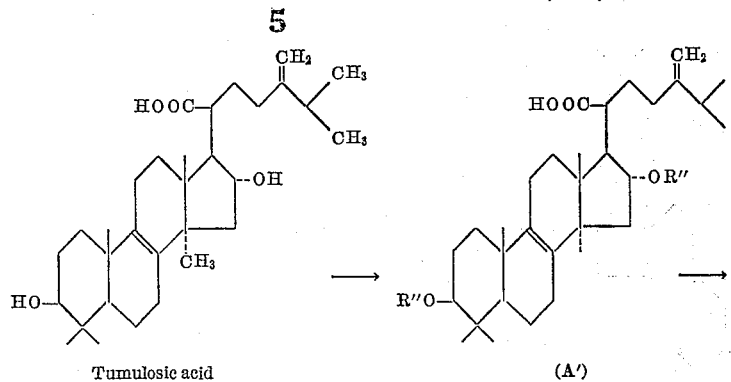

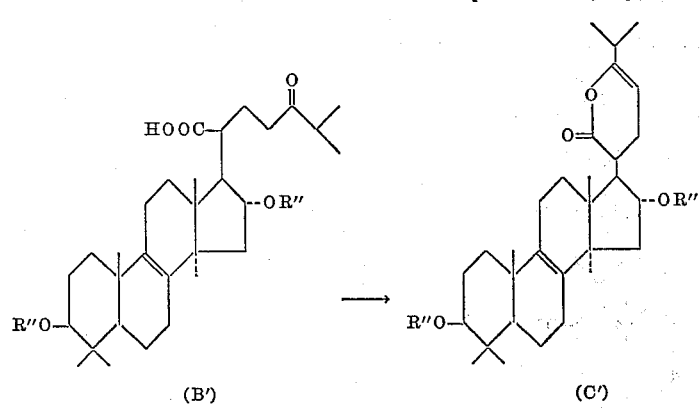

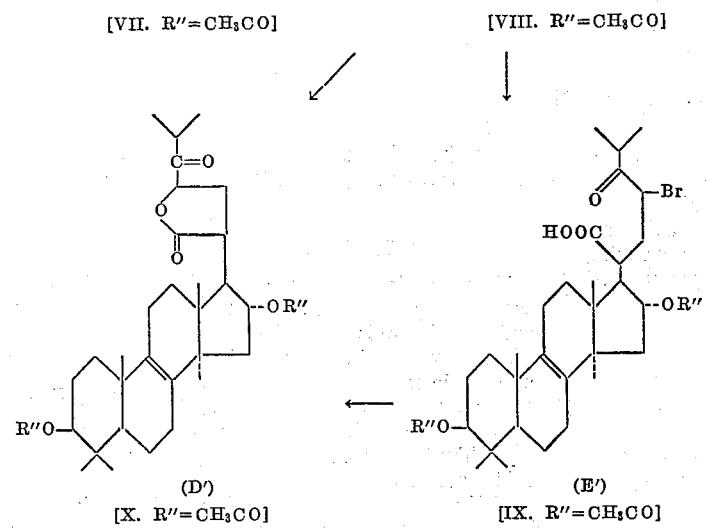

In the case of polyporenic acid, the results obtained differ slightly from those where eburicoic acid is employed. Polyporenic acid C when treated according to the procedures set forth above for eburicoic and tumulosic acids provides a final product which has a keto group in the 3 position. This is more clearly seen from the following equations representing the process:

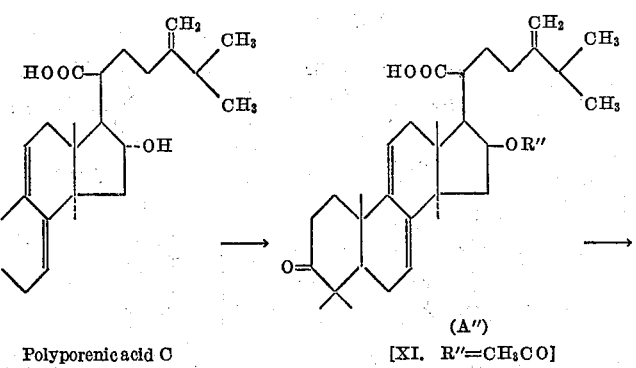

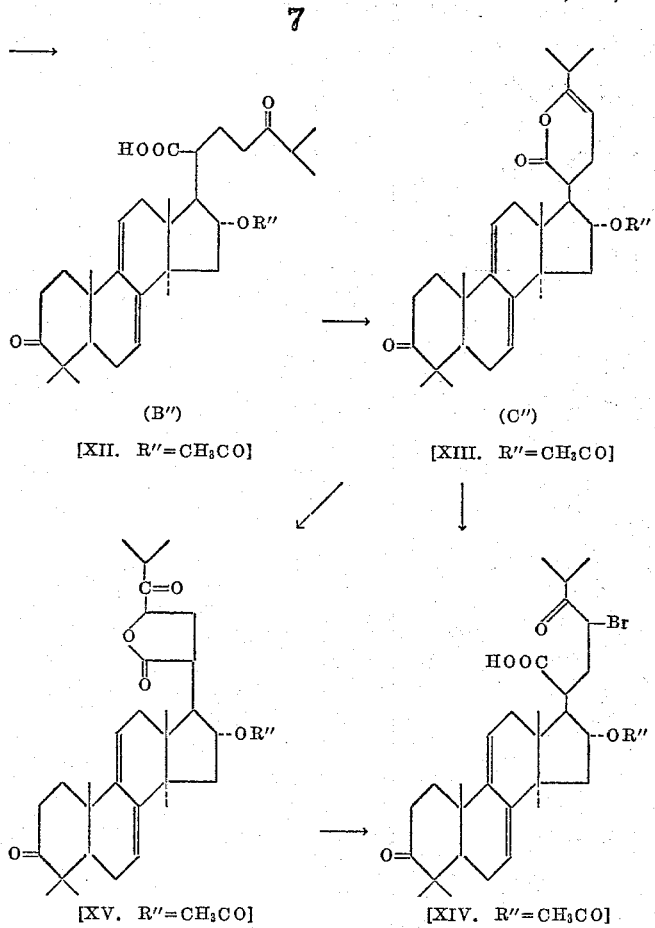

In the case of such triterpenoid acids as for example dehydroelemolic acid the substituents may be differently positioned in the final product from those obtained when eburicoic, tumulosic, polyporenic or other like acids are employed. This can be seen from the following formulae representing the starting materials and final products of the instant invention.

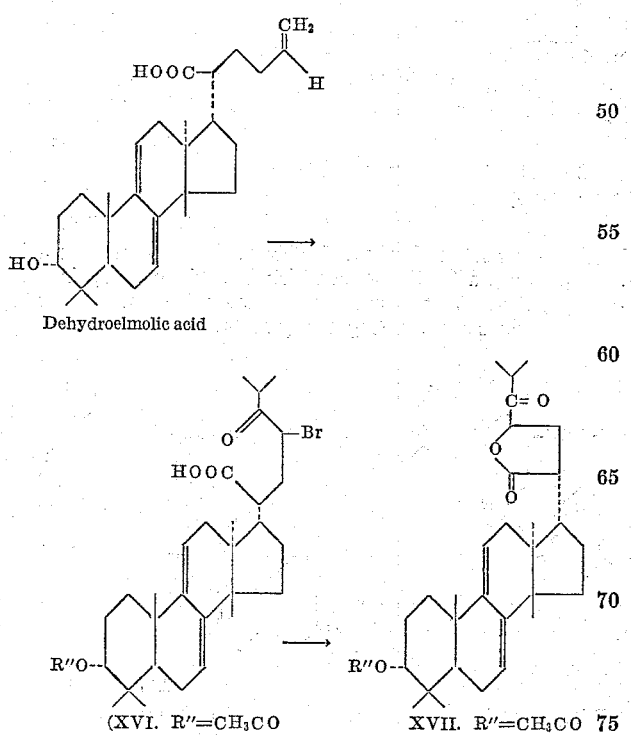

The following examples illustrate the invention (all temperatures being in centigrade):

EXAMPLE 1

*Eburicoic Acid 3-Acetate (I)*

To a solution of 10 g. of eburicoic acid in 50 ml. of anhydrous pyridine is added 10 ml. of acetic anhydride and the mixture is allowed to remain at room temperature for 18 hours. Five grams of ice is then added and 30 minutes later the mixture is diluted slowly with 250 ml. of ice and water. The resulting precipitate is filtered, washed thoroughly with water, dried in vacuo and recrystallized from 95% alcohol yielding pure eburicoic acid 3-acetate.

Similarly, by substituting other acid anhydride or acyl halides for the acetic anhydride in the procedure of Example 1, the corresponding 3-esters are formed. Thus, butyric anhydride, propionic anhydride and benzoyl chloride yield the 3-butyrate, 3-propionate and 3-benzoate of eburicoic acid respectively.

EXAMPLE 2

*Tumulosic Acid 3,16-Diacetate (VI)*

Following the procedure of Example 1, but substituting 5 g. of tumulosic acid for the eburicoic acid, tumulosic acid 3,16-diacetate is obtained.

EXAMPLE 3

*Polyporenic Acid C 16-Acetate (XI)*

Following the procedure of Example 1, but substituting 10 g. of polyporenic acid C for eburicoic acid, polyporenic acid C 16-acetate is obtained.

EXAMPLE 4

*Dehydroelemolic Acid 3α-Acetate*

Following the procedure of Example 1, but substituting 5 g. of dehydroelemonic acid for eburicoic acid, dehydroelemolic acid 3α-acetate is obtained.

EXAMPLE 5

*3β-Acetoxy-24-Keto-Δ⁸-Lanostene-21-Oic Acid (II)*

Through a solution of 15 g. of eburicoic acid 3-acetate (I) in a mixture of 150 ml. of chloroform and 150 ml. of ethyl acetate, cooled in a Dry Ice-acetone bath, is passed 26.2 l. of ozone (1 mole of ozone contained in .89 l. of oxygen). The resulting solution is allowed to warm to room temperature and then added to a suspension of 975 mg. of pre-reduced 5% palladium on charcoal catalyst in 50 ml. of ethyl acetate. 550 ml. of hydrogen is taken up rapidly, following which the solution is filtered and the filtrate evaporated to dryness in vacuo.

Alternately the ozonide can be decomposed with zinc in acetic acid as follows: The ozonolysis mixture obtained from 50 g. of eburicoic acid 3-acetate in 50 ml. of chloroform and 500 ml. of ethyl acetate, is allowed to warm up to $-10°$ when it is diluted with 50 ml. of glacial acetic acid. Powdered zinc is then added in portions with stirring and the temperature allowed to rise to $+15°$. A total of 25 g. of zinc is required. After 2½ hours the reaction mixture is filtered and the zinc and zinc salts washed thoroughly with ethyl acetate. The ethyl acetate-chloroform filtrate is washed thoroughly with water, dried over sodium sulfate and evaporated to dryness in vacuo. A total of about 56 g. of the crude keto acid (IV) is obtained.

The acid (II) is obtained in pure form by chromatography on neutral alumina. For this purpose a solution of 14 g. of the crude acid is dissolved in 50 ml. of benzene and charged to the column containing 280 g. of alumina. 50% chloroformbenzene (9 l.) elutes about 1.9 g. of pure acid melting at about 234–236°, which is followed by about 1.2 g. of acid when the eluant is changed to 75% chloroform in benzene (3 l.). An additional 1.3 g. of pure acid is obtained with chloroform (5 l.). The column is then stripped with 5% acetic acid in chloroform (2 l.) which elutes about 10.4 g. of crude material which is dissolved in 100 ml. of benzene and rechromatographed on 200 g. of silica gel. Elution with benzene (750 ml.) gives about 4 g. of amorphous material which is followed by crystalline acid (about 2.4 g.) when the eluant is changed to chloroform (8 l.). The pure acid (II) has the following properties: M.P. 236–238°; $[\alpha]_D^{23}$ $+52°$ (c., .49 in chlf.);

$\lambda_{max}^{CS_2}$ 5.78 and 5.90μ; $\lambda_{max}^{Nujol}$ 5.83–5.90; 8.05; 9.76 and 9.94μ.

*Analysis.*—Calcd. for $C_{32}H_{50}O_5$ (514.72): C, 74.67; H, 9.79. Found: C, 74.64; H, 9.54.

EXAMPLE 6

*3β,16α-Diacetoxy-24-Keto-Δ⁸-Lanostene-21-Oic Acid (VII)*

Tumulosic acid 3,16-diacetate is treated in accordance with the procedure set forth in Example 2 above, yielding 3β,16α-diacetoxy-24-keto-Δ⁸-lanostene-21-oic acid.

EXAMPLE 7

*16α-Acetoxy-3,24-Diketo-Dehydroeburicoic Acid (XII)*

Polyporenic acid C 16-acetate is treated in accordance with the procedures set forth in Example 2 above yielding 16α-acetoxy-3,24-diketo-dehydroeburicoic acid.

EXAMPLE 8

*3α-Acetoxy-24-Keto-Dehydroelemolic Acid*

Following the procedure of Example 5 but substituting (15 g.) of dehydroelemolic acid 3-acetate for the eburicoic acid 3-acetate, 3α-acetoxy-24-keto-dehydroelemolic acid is obtained.

EXAMPLE 9

*3β-Acetoxy-24-Hydroxy-Δ⁸,²³-Lanostadiene-21-Oic Acid Lacetone (α-Lactone) (III)*

To a solution of 15.4 g. of 3β-acetoxy-24-keto-Δ⁸-lanostene-21-oic acid (II) in 150 ml. of acetic anhydride is added 3.75 g. of anhydrous sodium acetate and the resulting suspension is heated under reflux for 10 hours. Upon cooling, the acetic anhydride solution is decanted from the sodium acetate and the latter washed thoroughly with benzene. The combined acetic anhydride-benzene solutions are evaporated to dryness in vacuo, the residue redissolved in benzene and filtered from the precipitated sodium acetate. The clear benzene solution is evaporated to dryness leaving a mixture of the α- and β-enol lactones (about 15.1 g.). Separation is achieved by chromatography on neutral alumina as follows: The total residue is dissolved in 50 ml. of benzene and 50 ml. of hexane and charged to a column containing 300 g. of neutral alumina. Elution with 250 ml. of benzene-hexane (1:1) produces about 3.1 g. of crude crystalline 3β-acetoxy-24-hydroxy-Δ⁸,²³-lanostadiene-21-oic acid is lactone (α-lactone), which after crystallization from 95% ethanol is analytically pure and has the following properties: M.P. about 169–171°;

$[\alpha]_D^{23}$ $+37°$; $\lambda_{max}^{Nujol}$ 5.69, 5.78, 5.93 (weak), 8.05, 12.05, 12.62, and 13.30μ.

The 12.05 and 12.63μ bands are diagnostic for the α-lactone.

*Analysis.*—Calcd. for $C_{32}H_{48}O_4$ (496): C, 77.37; H, 9.73. Found: C, 77.41; H, 9.82.

EXAMPLE 10

*3β,16α-Diacetoxy-24-Keto-Δ⁸,²³-Lanostadiene-21-Oic Acid Lactone (α-Lactone) (VIII)*

Treating the 3β,16α-diacetoxy-24-keto-Δ⁸-lanostene-21-oic (VII) in accordance with the procedures set forth in Example 9 above, yields 3β,16α-diacetoxy-24-keto-Δ⁸,²³-lanostadiene-21-oic acid lactone (α-lactone).

EXAMPLE 11

*16α-Acetoxy-3,24-Diketo-Δ⁷,⁹⁽¹¹⁾²³-Lanostatriene-21-Oic Acid Lactone (XIII) (α-Lactone)*

Treating the 16α-acetoxy-3,24-diketo-dehydroeburicoic acid (XII) obtained in Example 4 above, according to the procedure set forth in Example 7, yields 16α-acetoxy-3,24-diketo-Δ⁷,⁹⁽¹¹⁾²³-lanostatriene-21-oic acid lactone (α-lactone).

EXAMPLE 12

*3α-Acetoxy-24-Keto-Δ⁷,⁹⁽¹¹⁾²³-Lanostatriene-21-Oic Acid Lactone (α-Lactone)*

Treating the 3α-acetoxy-24-keto-dehydroelemonic acid according to the procedure of Example 9, yields 3α-acetoxy-24-keto-Δ⁷,⁹⁽¹¹⁾²³-lanostatriene-21-oic acid lactone (α-lactone).

EXAMPLE 13

*3β-Acetoxy-23-Bromo-24-Keto-Δ⁸-Lanostene-21-Oic Acid (IV)*

To a solution of 50 mg. (.101 mmole) of 3β-acetoxy-24-hydroxy-Δ⁸,²³-lanostadiene-21-oic acid lactone (III) in 3 ml. of dioxane is added 3 ml. of .167 N aqueous perchloric acid. To this mixture is added a solution of 37 mg. (.205 mmole) of N-bromosuccinimide in 3 ml. of dioxane. After 5 minutes the mixture is diluted with water and the resulting crystals filtered, washed with water and dried in vacuo at room temperature. This material represents essentially pure 3β-acetoxy-23-bromo-24-keto-Δ⁸- lanostene-21-oic acid.

*Analysis.*—Calcd. for $C_{32}H_{49}O_5Br$: Br, 13.46. Found: Br, 13.81.

The same results as obtained above are produced when

N-bromoacetamide or dibromo dimethyl hydantoin is substituted for the bromo succinimide of Example 13.

EXAMPLE 14

*3β,16α-Diacetoxy-23-Bromo-24-Keto-Δ⁸-Lanostene-21-Oic Acid (IX)*

Treating the 3β,16α-diacetoxy-24-keto-Δ⁸,²³-lanostadiene-21-oic acid lactone (VIII) according to the procedures set forth in Example 13 yields 3β,16α-diacetoxy-23-bromo-24-keto-Δ⁸-lanostene-21-oic acid.

EXAMPLE 15

*16α-Acetoxy-23-Bromo-3,24-Diketo-Δ⁷,⁹⁽¹¹⁾-Lanostadiene-21-Oic Acid (XIV)*

Treating the 16α-Acetoxy-3,24-diketo-Δ⁷,⁹⁽¹¹⁾²³-lanostatriene-21-oic acid lactone (XIII) according to the procedures set forth in Example 13 yields 16α-acetoxy-23-bromo-3,24-diketo-Δ⁷,⁹⁽¹¹⁾-lanostadiene-21-oic acid.

EXAMPLE 16

*3α-Acetoxy-23-Bromo-24-Keto-Δ⁷,⁹⁽¹¹⁾-Lanostadiene-21-Oic Acid (XVI)*

Treating the 3α-acetoxy-24-keto-Δ⁷,⁹⁽¹¹⁾²³-lanostatriene-21-oic acid lactone according to the procedures of Example 13 yields 3α-acetoxy-23-bromo-24-keto-Δ⁷,⁹⁽¹¹⁾-lanostadiene-21-oic acid.

EXAMPLE 17

*3β-Acetoxy-23-Hydroxy-24-Keto-Δ⁸-Lanostene-21-Oic Acid-21,23-Lactone (V)*

To a solution of 209 mg. (.42 mmole) of 3β-acetoxy-24-hydroxy-Δ⁸,²³-lanostadiene-21-oic acid lactone (III) in 15 ml. of pure dioxane and 8 ml. of an acetate buffer (obtained by dissolving 6.6 g. of anhydrous sodium acetate and 6.6 ml. of glacial acetic acid in 100 ml. of $H_2O$ is added a solution of 153 mg. (0.86 mmole) of N-bromosuccinimide in 15 ml. of dioxane over a 5-minute period. After an additional 5 minutes, excess water is added and the resulting crystalline product is filtered off and found to weigh about 200 mg. and has a melting point of about 223–226°. Recrystallization from ethyl acetate-hexane yields 114 mg. of 3β-acetoxy-23-hydroxy-24-keto-Δ⁸-lanostene-2-oic acid-21,23-lactone, having a melting point of about 230–232°. An additional 18 mg. is obtained from the mother liquor.

*Analysis.*—Calcd. for $C_{32}H_{48}O_5$: C, 74.96; H, 9.44. Found: C, 74.98; H, 9.52.

$\lambda_{max.}^{Nujol}$ 5.64, 5.83, 7.99μ

EXAMPLE 18

*3β,16α-Diacetoxy-23-Hydroxy-24-Keto-Δ⁸-Lanostene-21-Oic Acid-21,23-Lactone (X)*

Treating the 3β,16α-diacetoxy-24-keto-Δ⁸,²³-lanostadiene-21-oic acid lactone (VIII) according to the procedures of Example 17 yields 3β,16α-diacetoxy-23-hydroxy-24-keto-Δ⁸-lanostene-21-oic acid-21,23-lactone.

EXAMPLE 19

*16α-Acetoxy-23-Hydroxy-3,24-Diketo-Δ⁷,⁹⁽¹¹⁾-Lanostadiene-21-Oic Acid-21,23-Lactone (XV)*

Treating the 16α-acetoxy-3,24-diketo-Δ⁷,⁹⁽¹¹⁾²³-lanostatriene-21-oic acid lactone (XIII) according to the procedures of Example 17 yields, 16α-acetoxy-23-hydroxy-3,24-diketo-Δ⁷,⁹⁽¹¹⁾-lanostadiene-21-oic acid-21,23-lactone.

EXAMPLE 20

*3α-Acetoxy-23-Hydroxy-24-Keto-Δ⁷,⁹⁽¹¹⁾-Lanostadiene-21-Oic Acid-21,23-Lactone (XVII)*

Treating the 3α-acetoxy-24-keto-Δ⁷,⁹⁽¹¹⁾-lanostatriene-21-oic acid lactone according to the procedures set forth in Example 17 yields, 3α-acetoxy-23-hydroxy-24-keto-Δ⁷,⁹⁽¹¹⁾-lanostadiene-21-oic acid-21,23-lactone.

EXAMPLE 21

*3β-Acetoxy-23-Hydroxy-24-Keto-Δ⁸-Lanostene-21-Oic Acid-21,23-Lactone (V)*

To a solution of 100 ml. of 3β-acetoxy-23-bromo-24-keto-Δ⁸-lanostene-21-oic acid (IV) in 5 ml. of dioxane is added 2 ml. of an acetate buffer obtained by dissolving 6.6 g. of anhydrous sodium acetate and 6.6 ml. of glacial acetic acid and 100 ml. of $H_2O$ and the mixture allowed to remain at room temperature for one hour. Water is then added and the resulting lactone filtered off. The material obtained is 3β-acetoxy-23-hydroxy-24-keto-Δ⁸-lanostene-21-oic acid-21,23-lactone and is identical with that produced in Example 17.

EXAMPLE 22

*3β-Acetoxy-23-Hydroxy-24-Keto-Δ⁸-Lanostene-21-Oic Acid-21,23-Lactone (V)*

50 mg. of 3β-acetoxy-23-bromo-24-keto-Δ⁸-lanostene-21-oic acid (IV) is refluxed with 1 ml. of collidine for five minutes. 3β-acetoxy-23-hydroxy-24-keto-Δ⁸-lanostene-21-oic acid in 21,23-lactone (V) is obtained. Likewise, the same results are obtained by substituting 1 ml. of acetic anhydride and 50 mg. of calcium carbonate for the collidine of Example 22.

EXAMPLE 23

*3β,16α-Diacetoxy-23-Hydroxy-24-Keto-Δ⁸-Lanostene-21-Oic Acid-21,23-Lactone (X)*

Treating the 3β,16α-diacetoxy-23-bromo-24-keto-Δ⁸-lanostene-21-oic acid (IX) according to the procedures set forth in Example 21 yields 3β,16α-diacetoxy-23-hydroxy-24-keto-Δ⁸-lanostene-21-oic acid-21,23-lactone.

Similarly, treating the 3β,16α-diacetoxy-23-bromo-24-keto-Δ⁸-lanostene-21-oic acid (IX) according to the procedures set forth in Example 22, 3β,16α-diacetoxy-23-hydroxy-24-keto-Δ⁸-lanostene-21-oic acid is obtained.

EXAMPLE 24

*16α-Acetoxy-23-Hydroxy-3,24-Diketo-Δ⁷,⁹⁽¹¹⁾-Lanostadiene-21-Oic Acid-21,23-Lactone (XV)*

Treating the 16α-acetoxy-23-bromo-3,24-diketo-Δ⁷,⁹⁽¹¹⁾-lanostadiene-21-oic acid (XIV) according to the procedures set forth in Example 21 yields 16α-acetoxy-23-hydroxy-3,24-diketo-Δ⁷,⁹⁽¹¹⁾-lanostadiene-21-oic acid-21,23-lactone.

Similarly, treating the 16α-acetoxy-23-bromo-3,24-diketo-Δ⁷,⁹⁽¹¹⁾-lanostadiene-21-oic acid (XIV) according to the procedures set forth in Example 22, 16α-acetoxy-23-hydroxy-3,24-diketo-Δ⁷,⁹⁽¹¹⁾-lanostadiene-21-oic acid-21,23-lactone is obtained.

EXAMPLE 25

*3α-Acetoxy-23-Hydroxy-24-Keto-Δ⁷,⁹⁽¹¹⁾-Lanostadiene-21-Oic Acid-21,23-Lactone (XVII)*

Treating the 3α-acetoxy-23-bromo-24-keto-Δ⁷,⁹⁽¹¹⁾-lanostadiene-21-oic acid (XVII) according to the procedures set forth in Example 21 yields 3α-acetoxy-23-hydroxy-24-keto-Δ⁷,⁹⁽¹¹⁾-lanostadiene-21-oic acid.

Similarly, treating the 3α-acetoxy-23-bromo-24-keto-Δ⁷,⁹⁽¹¹⁾-lanostadiene-21-oic acid (XVII) according to the procedures set forth in Example 22 yields 3α-acetoxy-23-hydroxy-24-keto-Δ⁷,⁹⁽¹¹⁾-lanostadiene-21-oic acid.

This invention may be variously otherwise embodied within the scope of the appended claims.

What we claim is:
1. A compound selected from the group consisting of steroids of the formulae:

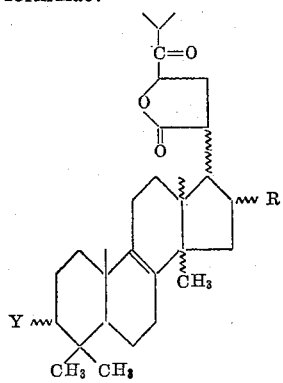

and

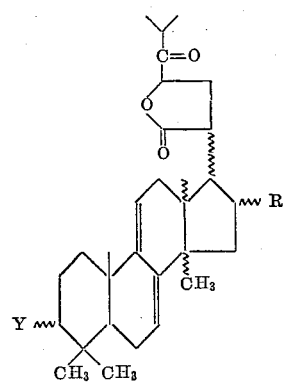

wherein Y is selected from the group consisting of oxo (O=) and the acyloxy radical of a hydrocarbon carboxylic acid of less than twelve carbon atoms; and R is selected from the group consisting of hydrogen and the acyloxy radical of a hydrocarbon carboxylic acid of less than twelve carbon atoms.

2. A compound selected from the group consisting of steroids of the formulae:

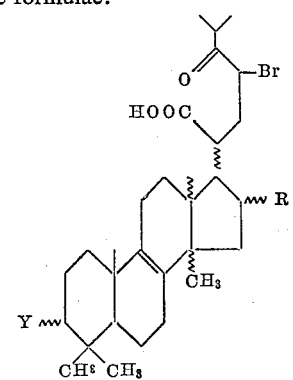

and

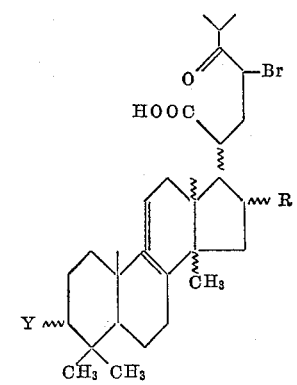

wherein Y is selected from the group consisting of oxo (O=) and the acyloxy radical of a hydrocarbon carboxylic acid of less than twelve carbon atoms; and R is selected from the group consisting of hydrogen and the acyloxy radical of a hydrocarbon carboxylic acid of less than twelve carbon atoms.

3. 3 - acetoxy - 23-bromo-24-keto-$\Delta^8$-lanostene-21-oic acid.

4. 16$\alpha$ - acetoxy - 23 - hydroxy-3,24-diketo-$\Delta^{7,9(11)}$-lanostadiene-21-oic acid-21,23-lactone.

5. 3$\beta$,16$\alpha$ - diacetoxy-23-hydroxy-24-keto-$\Delta^8$-lanostene-21-oic acid-21,23-lactone.

6. The method of producing the compounds of claim 1 which comprises treating the compounds of claim 2 with a basic reagent selected from the group consisting of sodium acetate, collidine and acetic anhydride.

7. The method of producing the compounds of claim 2 which comprises treating a compound selected from the group consisting of steroids of the formulae:

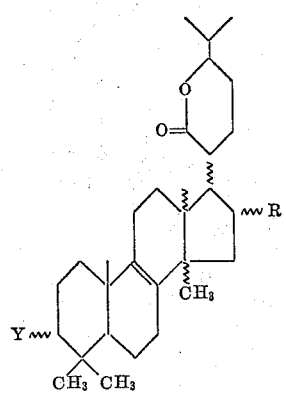

and wherein Y is selected from the group consisting of oxo (O=) and the acyloxy radical of a hydrocarbon carboxylic acid of less than twelve carbon atoms; and R is selected from the group consisting of hydrogen and the acyloxy radical of a hydrocarbon carboxylic acid of less than twelve carbon atoms; with a compound selected from the group consisting of bromoimide, bromoamide and bromohydantoin, in a perchloric acid medium.

8. A method of producing the compounds of claim 1 which comprises treating a buffered solution of a compound selected from the group of steroids of the formulae:

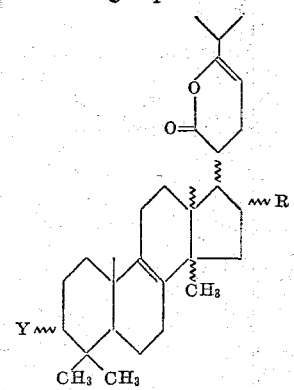

and

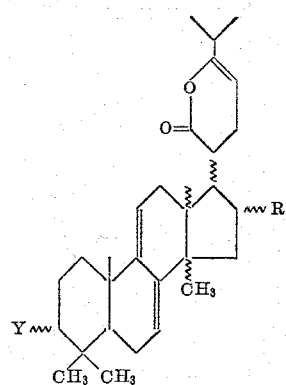

wherein Y is selected from the group consisting of oxo (O=) and the acyloxy radical of a hydrocarbon carboxylic acid of less than twelve carbon atoms; and R is selected from the group consisting of hydrogen and the acyloxy radical of a hydrocarbon carboxylic acid of less than twelve carbon atoms; with a compound selected from the group consisting of a haloimide, haloamide and halohydantoin.

9. The process of claim 7 wherein the bromoimide is N-bromo-succinimide.

10. 16α - acetoxy - 23 - bromo - 3,24 - diketo-$\Delta^{7,9(11)}$-lanostadiene-21-oic acid.

11. 3 - acetoxy-23-bromo-24-keto-$\Delta^{7,9(11)}$-lanostadiene-21-oic acid.

12. 3β,16α - diacetoxy-23-bromo-24-keto-$\Delta^8$-lanostene-21-oic acid.

13. 3 - acetoxy - 23 - hydroxy - 24 - keto - $\Delta^{7,9(11)}$-lanostadiene-21-oic acid-21,23-lactone.

References Cited in the file of this patent

Rosenthal et al.: "Journal of American Chemical Society," vol. 84, Mar. 5, 1962, pages 877–879.